United States Patent

[11] 3,554,328

[72] Inventor Vercoe C. Jones
 Faribault, Minn.
[21] Appl. No. 798,697
[22] Filed Feb. 12, 1969
[45] Patented Jan. 12, 1971
[73] Assignee Nutting Truck and Caster Company
 Faribault, Minn.
 a corporation of Minnesota

[54] FLOOR TRUCK LOCK
 1 Claim, 4 Drawing Figs.
[52] U.S. Cl................................................ 188/5,
 248/355
[51] Int. Cl................................................ B60t 1/14
[50] Field of Search.................................... 188/5, 6, 7;
 248/354C, 355, 410

[56] References Cited
 UNITED STATES PATENTS
 2,236,281 3/1941 Anderson..................... 188/5
 2,421,328 5/1947 Herold......................... 188/5
 2,806,723 9/1957 Fairclough................... 248/355X
 2,851,126 9/1958 Ward, Jr....................... 188/5
Primary Examiner—George E. A. Halvosa
Attorneys—Frederick E. Lange, John J. Held, Jr. and Eugene
 L. Johnson ABSTRACT: A floor truck lock for temporarily securing a movable device, such as an industrial cart, in a fixed position. An extensible and retractable member is extended generally downward from a housing mounted to the device to engage a fixed surface. Means is provided to releasably lock the extensible member in engagement with the fixed surface and the elements are associated in a highly compact and efficient manner.

PATENTED JAN 12 1971

3,554,328

INVENTOR.
VERCOE C. JONES
BY
ATTORNEY

3,554,328

FLOOR TRUCK LOCK

BACKGROUND OF THE INVENTION

The invention relates to the field of temporarily securing movable devices in a fixed position. It is especially useful in association with small vehicles such as freight carts, industrial trucks, stands, and work benches.

Prior devices such as that disclosed by Ward in U.S. Pat. No. 2,851,126 entitled "Spring Yieldable Adjustable Support" have generally lacked compactness and simplicity of the present invention. In addition such prior art devices have lacked the capacity to adjust to irregularities in the fixed surface beneath the industrial truck or other object which is to be temporarily locked into position. The present invention is also less expensive since the housing design employed is convenient to mold and eliminates costly machining and welding. In addition, a directly operating means is provided for releasably securing the extensible sleeve in the extended position, as distinguished from the more complicated linkages used in prior art.

The present invention provides a high compact reliable device which is easily fabricated, consists of a minimum number of moving parts, and is very durable.

SUMMARY

The present invention is characterized by an elongate tapered housing which has an axial cavity that is generally vertical, and a transverse cavity that is generally horizontal. A sleeve is reciprocable or slidable in the axial cavity of the housing from a retracted or withdrawn position in the cavity, to an extended position in which a substantial portion of the sleeve is exposed outside of the cavity. A flange is provided on the exterior end of the the sleeve for engagement by the foot of the operator to push the sleeve downwardly to engage its associated foot plate with a fixed surface. The foot plate associated with the sleeve is provided with a rubber sole and is yieldably mounted with respect to the sleeve on a spring-seated plunger. A spring is also provided for retracting or withdrawing the sleeve into the axial cavity when the sleeve is released from its extended position. Means is provided for preventing rotational movement of the sleeve about the longitudinal axis of the housing and automatically-setting, releasable means is provided for securing the sleeve in its extended position with respect to the housing. The automatically-setting, releasable means is characterized by one or more plates disposed in the transverse cavity and which each include an opening through which the sleeve extends. The plates are urged obliquely with respect to the longitudinal axis of the sleeve to thereby cause the edges of the opening in each of the plates to engage and bite into the sleeve to prevent retraction thereof. When the plates are pushed into a plane substantially perpendicular to the axis of the sleeve, the edges of the openings no longer engage and bite into the sleeve, so that the sleeve is then free to retract, under the force of the spring, upwardly into the axial cavity of the housing.

DESCRIPTION OF DRAWINGS.

FIG. is a perspective view of the floor truck lock which comprises the present invention. The elements are shown in the retracted position.

DESCRIPTION OF PREFERRED EMBODIMENT

Figure 1:
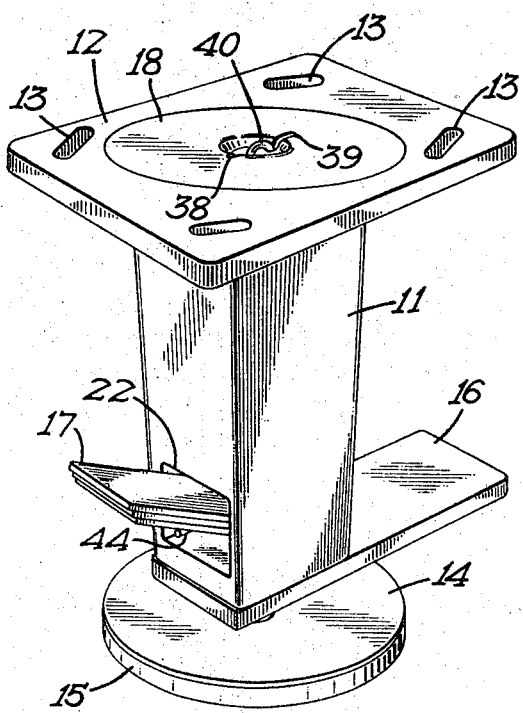

The general elements which together comprise the present invention may be readily seen with reference to FIG. 1. Housing 11 is generally elongate and tapered and has a rectangular cross section. It includes an upper flange 12 formed integrally therewith. Flange 12 is provided with four openings 13 for use in mounting housing 11 to an industrial cart or other vehicle to be temporarily locked into position. Base plate 14 is generally circular or disc shaped and includes a rubber fixed-surface engaging sole 15. Flange 16 provides a means for extending the floor truck lock to thereby push rubber sole 15 of foot plate 14 into engagement with a fixed surface. When so extended, plates 17 serve to lock the elements in the extended position shown in FIG. 3. A downward force on the exposed ends of plate 17, such as by means of the operator's foot, releases the floor lock, and the elements are then free to retract into the position shown in FIG. 2. Cover plate 18 serves as an upper cover for the axial cavity of housing 11 and also serves as a means for mounting the upper end of spring 19.

Figure 2:
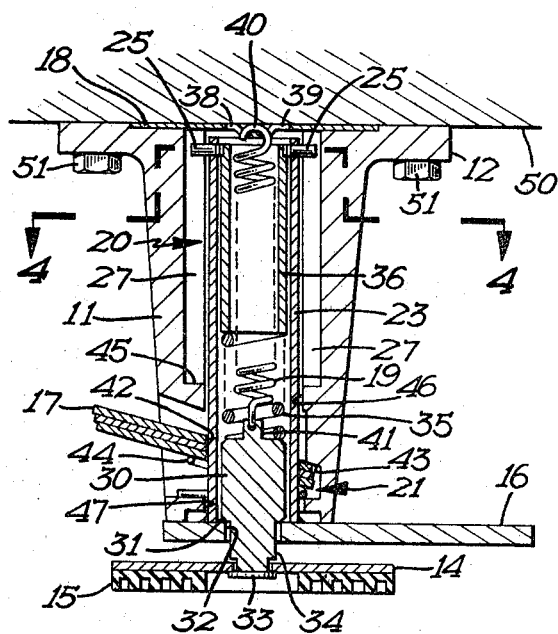
FIG. 2 is a vertical sectional view of the floor truck lock and also shows the elements in the retracted position.

The detailed design and construction of the present invention may be readily understood with reference first to FIG. 2. Housing 11 is formed with integral flange 12 and has an internal axial cavity 20. Housing 11 also has a generally transverse cavity 21 which opens in one side of housing 11 at opening 22. A cover plate 18 is seated at the upper end of housing 11, as shown in FIG. 2, to provide a smooth upper surface from one edge of flange 12 to the opposite edge and to serve as a means for securing the upper end of spring 19.

In the preferred embodiment shown sleeve 23 is circular in cross section and, in the retracted position shown in FIG. 2, occupies the entire length of cavity 20. Sleeve 23 is slidable in housing 11 from the retracted position of FIG. 2 to the extended position of FIG. 3. Flange 16 mounted to the lower exterior end of sleeve 23 and abuts the bottom surface of housing 11 when sleeve 23 is in its retracted position. Flange 16 serves as a means for pushing sleeve 23 into its extended position and is usually engaged by the operator's foot for that purpose.

Figure 4:
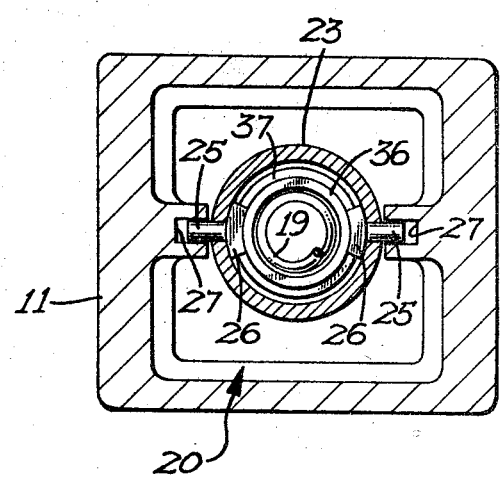
FIG. 4 is a sectional view taken on the line 4—4 of FIG. 2 and shows the housing, retractable and extensible sleeve, and pin and groove design which prevents rotation of the sleeve with respect to the housing.

Sleeve 23 is fixed with respect to rotational movement about its longitudinal axis by means of diametrically opposed pins 25. Pins 25 are formed with an arcuate base position 26 and extend through openings at the upper end of sleeve 23 and into grooves 27 formed in housing 11. Grooves 27, best seen in FIGS. 2 and 4, extend longitudinally in housing 11 for the vertical distance of axial cavity 20. Thus, sleeve 23 and pins 25 are free to slide longitudinally in axial cavity 20 of housing 11 but sleeve 23 is not free to rotate about its longitudinal axis with respect to housing 11.

A spring-seated floating plunger 30 is disposed inside sleeve 23 and emerges from sleeve 23 at flange 16. Plunger 30 is provided with shoulder 31 which engages opening 32 in flange 16 to prevent complete emergence of plunger 30 from sleeve 23. Circular foot plate 14 is loosely mounted to the exposed end of plunger 30 by means of washer 33 welded thereto. Neck portion 34 of plunger 30 is sufficiently long to allow a floating action of plunger 30 with respect to sleeve 23.

This floating action of plunger 30 occurs when sufficient force is applied to overcome the compressive force of coil spring 35. Spring 35 is disposed inside sleeve 23 and is compressed between tubular member 36, disposed inside sleeve 23, and the upper surface of plunger 30. The force of spring 35 tends to hold plunger 30 in the position shown in FIG. 2, with shoulder 31 in engagement with opening 32 of flange 16. Thus, spring 35 is fixed with respect to sleeve 23 at its upper end, and engages plunger 30 at its lower end, to thereby yieldably mount plunger 30 and foot plate 14 with respect to sleeve 23.

Tubular member 36 is mounted inside sleeve 23 and held in place at its upper end by arcuate portions 26 of pins 25 which engage tubular member 36 at shoulder 37. Shoulder 37 also serves to positively mount pins 25 in sleeve 23. Thus pins 25 are securely mounted to extend into grooves 27 and cannot be displaced as a result of movement therein. In other words, pins 25 cannot "work loose" during operation of the present invention. At its lower end, tubular member 36 engages spring 35 which exerts a compressive force between tubular member 36 and plunger 30. Thus tubular member 36 is fixed with respect to sleeve 23 and moves therewith.

Sleeve 23 and its associated elements are urged into the retracted position shown in FIG. 2 by means of spring 19. Spring 19 is fixed at its upper end with respect to housing 11 at cover plate 18. Cover plate 18 is provided with a pair of slots 38 and 39 which provide a convenient means for hooking the spring 19 thereto. More particularly, slot 39 is formed with sufficient length so that the entire width of hook 40 of spring 19 may be inserted therein with hook 40 oriented in the position shown in FIG. 2. Hook 40 may then be moved laterally so that its tip is inserted into slot 38 thereby completing the attachment of hook 40 to cover plate 18. It should also be pointed out that the central portion of cover 18 in the vicinity of slots 38 and 39 is recessed so that when hook 40 of spring 19 is mounted to cover plate 18 there is no protrusion above the plane defined by the upper surface of flange 12. At the same time the recessed portion of cover plate 18 does not decrease the stroke of sleeve 23 since the diameter thereof is less than the inside diameter of tubular member 36.

The lower end of spring 19 is connected to stud 41 of plunger 30. Thus spring 19 tends to draw sleeve 23 and its associated elements upwardly into the retracted position shown in FIG. 2. In so doing, spring 19 acts against the compressive force of spring 35 to apply compressive force to tubular member 36 which, through pins 25, causes sleeve 23 to be drawn into the retracted position.

Figure 3:
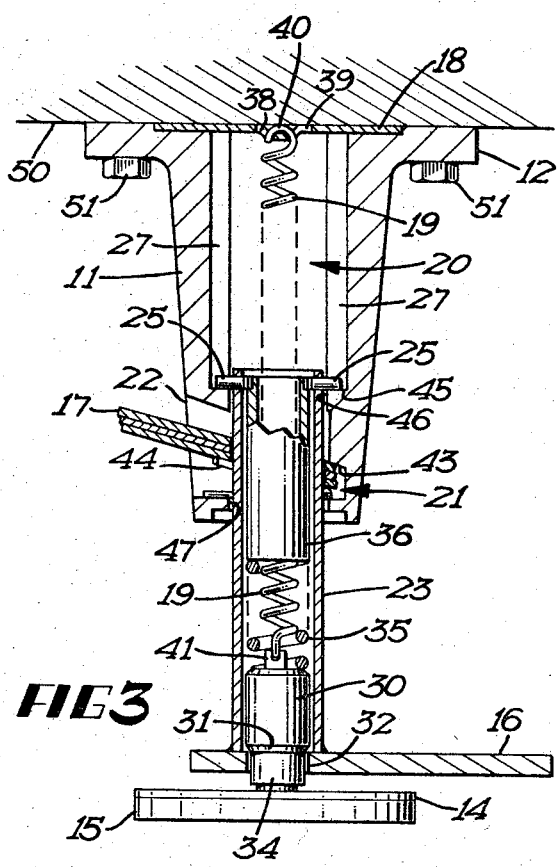
FIG. 3 is a vertical sectional view similar to the view of FIG. 2 but with the elements in an extended position.

The releasable sleeve securing means for seating or securing sleeve 23 in an extended position may be best understood with reference to FIG. 2. The sleeve securing means is characterized by one or more plates 17. In the specific embodiment shown there are three such plates, although the specific number may vary. Each plate 17 is provided with an opening 42 which is slightly larger than the outside diameter of sleeve 23. Plates 17 abut inner shoulder 43 of transverse cavity 21 at one end and extend outwardly from transverse cavity 21 through opening 22 of housing 11 at the other end. The inside diameter of opening 42 in each stacked plate 17 is chosen to provide a tolerance with respect to the outside diameter of sleeve 23 when plates 17 assume a plane perpendicular to the axis of sleeve 23. When however, plates 17 are moved obliquely with respect to the axis of sleeve 23, the edges of openings 42 engage and bite into sleeve 23 as shown in FIGS. 2 and 3. Spring 44 is provided to urge plates 17 into this oblique position. It may be noted that downward movement of sleeve 23 tends to urge plates 17 against the force of spring 44, toward a plane perpendicular to sleeve 23, thus disengaging openings 42 from sleeve 23 and allowing movement thereof. Upward movement, however, of sleeve 23, in the absence of downward force on plates 17, tends to increase the oblique relationship between plates 17 and the axis of sleeve 23, and increases the biting and holding.

Thus plates 17 provide means for securing sleeve 23 with respect to housing 11 in an extended position. Plates 17 release sleeve 23 when a downward force is applied on the exposed surface thereof to move plates 17 against the force of spring 44 into a plane substantially perpendicular to the axis of sleeve 23.

It should be noted that pins 25 serve as a means for preventing complete extension of sleeve 23 from housing 11 since they abut the shoulder 45 of groove 27 when sleeve 23 is fully extended, as shown in FIG. 3.

The primary bearing surfaces for sleeve 23 are surface 46 and surface 47 which bracket transverse cavity 21. Such an arrangement contributes to compactness of the present invention. Some length is required between bearing surfaces 46 and 47 to provide for rigidity of sleeve 23 with respect to housing 11, when sleeve 23 is in its extended position. In the present invention, this length is provided yet the distance between bearing surfaces 46 and 47 is not wasted since transverse cavity 21 and stacked plates 17 are positioned therein.

It should also be pointed out that foot plate 14 is loosely mounted with respect to plunger 30 to provide for additional floating action to compensate for irregular surfaces beneath the industrial cart.

In operation the floor truck lock is mounted to the lower surface 50 of an industrial cart, for example, by means of bolts 51. When it is desired to temporarily secure the industrial cart, such as for loading and unloading, downward force is applied by means of the operator's foot to flange 16. Sleeve 23 and its associated elements are thereby extended from housing 11 against the tension of spring 19. As sleeve 23 moves downwardly, pins 25 slide in grooves 27 and cause tubular member 36 to move downwardly with sleeve 23. Plates 17 tend to move into a plane perpendicular to the axis of sleeve 23 and consequently release their bite on sleeve 23. Spring 35, abutting tubular member 36, exerts compressive force on plunger 30. When sole 15 of foot plate 14 engages a fixed surface, continued force by the operator's foot on flange 16 results in continued extension of sleeve 23 to compress spring 35. As spring 35 is compressed, and the downward force against flange 16 is released the upward force of spring 35, in association with the force of spring 44 and spring 19, causes each plate 17 to bite into sleeve 23 to prevent retraction thereof.

It should be noted that in the extended position, with foot plate 14 in engagement with a fixed surface, force applied to the temporarily secured vehicle is absorbed by the floating action of pin 30 against the compressive force of spring 35. Thus sole 15 of base plate 14 is maintained in constant engagement with the fixed surface and resists movement through the frictional force developed between sole 15 and the fixed surface as a result of the load or normal force on sole 15 imposed by spring 35.

The floor truck lock which comprises the present invention is released to move from the extended to the retracted position by downward pressure applied to plates 17 to thereby release sleeve 23. With reference to FIG. 3, as plates 17 are pivoted counterclockwise about shoulder 43, sleeve 23 is released so that the tension in spring 19 pulls the elements upwardly into the retracted or withdrawn position shown in FIG. 2.

It is clear that the invention may be embodied in other forms without departing from the spirit or central characteristics thereof. The present embodiment is thus to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. An extensible and retractable holding or locking device comprising:

an elongate housing which defines an axial cavity and a transverse cavity;

a sleeve axially reciprocably mounted in said axial cavity and emerging from said housing;

a flange on said sleeve exterior of said housing;

stop means for preventing complete withdrawal of said sleeve from said housing;

a plunger axially mounted in said sleeve for limited axial reciprocating movement with respect thereto, said plunger emerging therefrom;

a foot plate loosely mounted to said plunger exterior of said sleeve in a plane transverse to the axis of said plunger;

first resilient means mounted inside said sleeve and fixed with respect thereto for urging said plunger in a direction tending to move said foot plate away from said sleeve;

second resilient means weaker than said first resilient means mounted inside said sleeve and fixed with respect to said housing for urging said plunger in a direction tending to retract said sleeve into said axial cavity;

a cover plate recess seated in said housing transversely to said longitudinal axis of said sleeve, said cover plate defining a slot and recessed means for securing said second resilient means thereto;

means for preventing rotational movement of said sleeve about its longitudinal axis with respect to said housing comprising at least one groove defined by said housing and extending parallel to said longitudinal axis of said sleeve and at least one pin characterized by an enlarged portion abutting said tubular member and a neck portion extending through said sleeve into said groove for sliding movement therein;

releasable sleeve securing means for setting said sleeve with respect to said housing in an extended position including at least one plate extending from said housing in said transverse cavity, each said plate defining an opening substantially filled by said sleeve, and means urging each said plate obliquely with respect to said longitudinal axis of said sleeve to thereby cause certain edges of said openings in each said plate to engage and bite into said sleeve to prevent retraction thereof; and bearing means defined by said housing, slidably engaged by said sleeve and respectively spaced along the axis of said sleeve on each side of said releasable sleeve securing means.